United States Patent [19]

Sloan et al.

[11] Patent Number: 5,137,414
[45] Date of Patent: Aug. 11, 1992

[54] TRANSLATABLE TILT-BED TRAILER APPARATUS

[76] Inventors: Wesley S. Sloan, Rte. 2, Box 100; Marvin D. Sloan, Rte. 8, Box 139B, both of Sherman, Tex. 75090

[21] Appl. No.: 620,526

[22] Filed: Nov. 29, 1990

[51] Int. Cl.⁵ .............................................. B60P 1/32
[52] U.S. Cl. ..................................... 414/477; 414/483
[58] Field of Search .............................. 414/474–480, 414/482–485, 522; 298/12–16

[56] References Cited

U.S. PATENT DOCUMENTS

| | | | |
|---|---|---|---|
| 2,534,156 | 12/1950 | Wyatt et al. | 298/12 |
| 2,753,064 | 7/1956 | Lesser | 414/475 |
| 2,803,362 | 8/1957 | Saenz | 414/480 |
| 2,859,889 | 11/1958 | Love | 414/475 |
| 3,074,574 | 1/1963 | Prince | 414/477 |
| 3,472,406 | 10/1969 | Slipp | 414/475 |
| 3,624,786 | 11/1971 | Lundahl | 414/483 X |
| 3,690,490 | 9/1972 | Hall | 414/477 |
| 3,829,064 | 8/1974 | Jackson | 414/522 X |
| 3,987,919 | 10/1976 | Weeks et al. | 414/475 X |
| 4,681,334 | 7/1987 | O'Brien, Jr. | 414/475 X |
| 4,685,857 | 8/1987 | Goeser et al. | 414/522 |
| 4,715,767 | 12/1987 | Edelhoff et al. | 414/477 X |
| 4,806,061 | 2/1989 | Fenton | 414/475 |
| 4,813,841 | 3/1989 | Eischen | 414/477 |
| 4,889,377 | 12/1989 | Hughes | 414/522 X |
| 4,889,515 | 12/1989 | Auer et al. | 414/477 X |
| 4,986,719 | 1/1991 | Galbreath | 414/478 |
| 5,006,033 | 4/1991 | McConnell | 414/477 |

Primary Examiner—David A. Bucci
Attorney, Agent, or Firm—Johnson & Gibbs

[57] ABSTRACT

An improved translatable tilt-bed trailer has an elongated support bed which is rollingly mounted on the top side of a dual axle, wheeled undercarriage provided with a manually operable mechanical brake system and a front-to-rear spring equalizing system. The front end of the support bed is provided with a lockable, articulated tongue portion connectable to the hitch ball of a towing vehicle. To load an item onto the support bed, the mechanical trailer brakes are locked; the articulated tongue, and a pair of support bed retaining pins, are unlocked; and the towing vehicle is backed toward the stationary undercarriage to rearwardly move and downwardly tilt the bed. As the rear end of the tilting bed touches the ground, a pair of front stops on the bed engage the undercarriage frame and stop the rearward movement of the bed. The item to be loaded is then moved up the inclined bed and suitably secured thereto. The towing vehicle is then moved forwardly to roll the bed back to its original position on the undercarriage and tilt it back to a horizontal orientation, at which time rear stops on the bed interlock with the undercarriage frame and the bed retaining pins automatically snap back to their bed-locking positions. The articulated tongue is then re-locked, and the trailer brakes released, to permit the loaded item to be towed away.

2 Claims, 4 Drawing Sheets

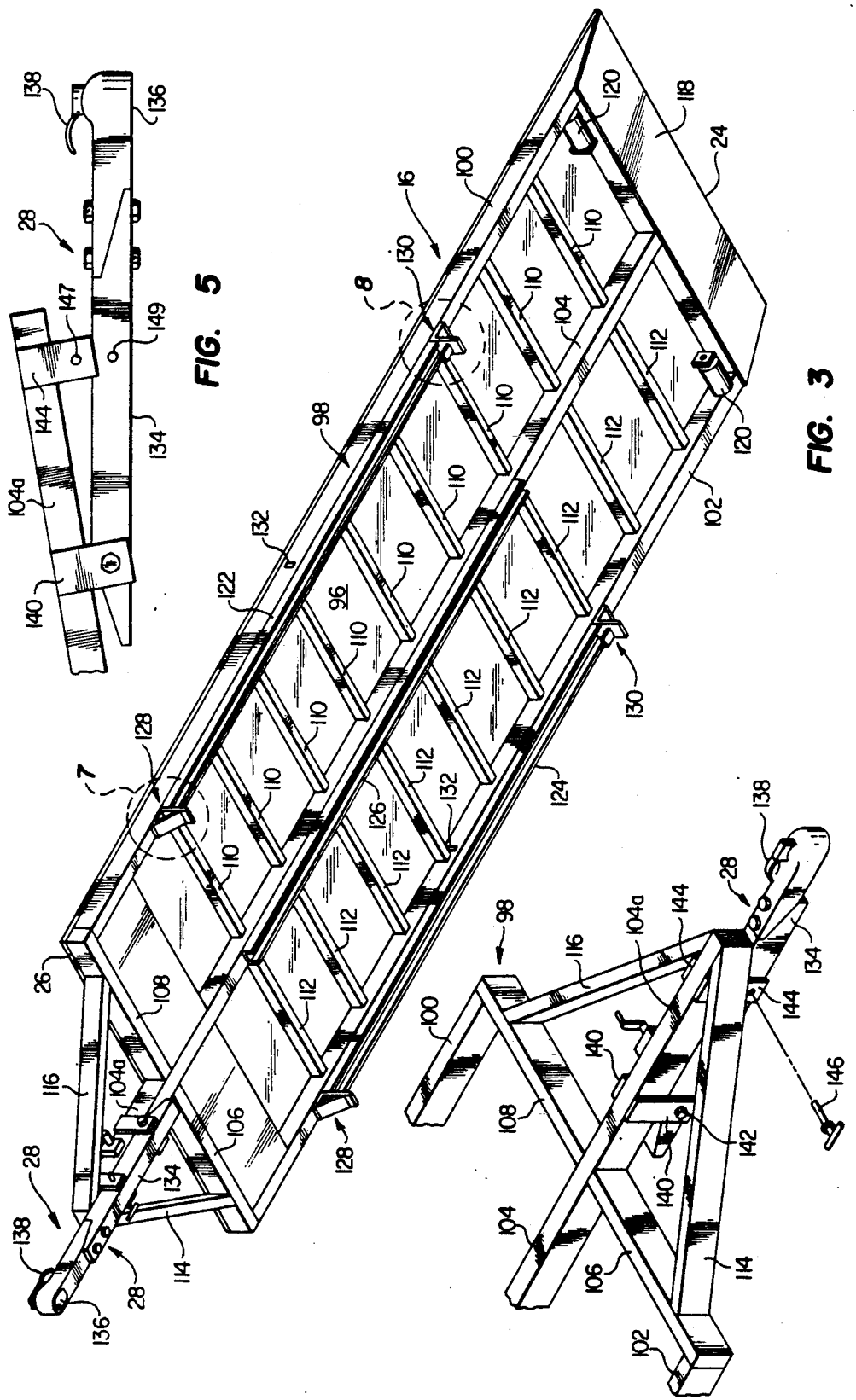

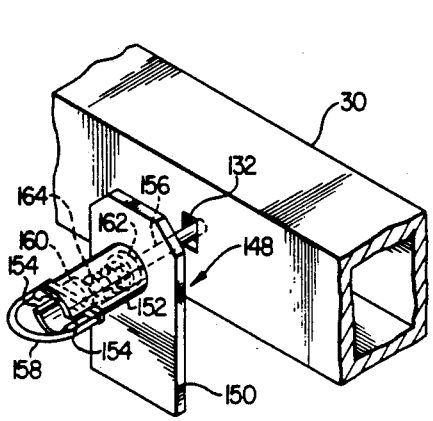
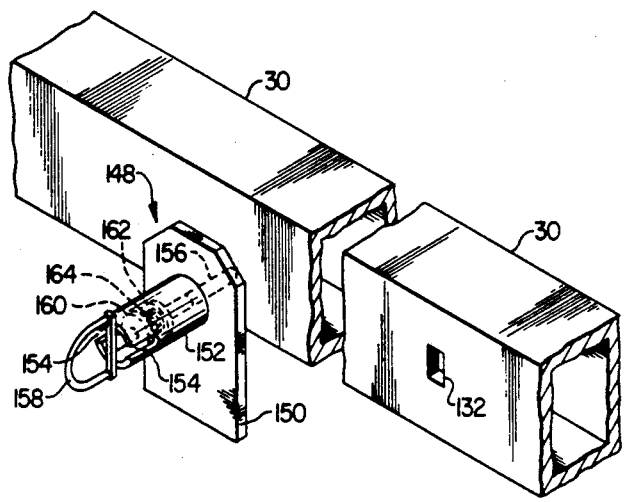
FIG. 6A  FIG. 6B
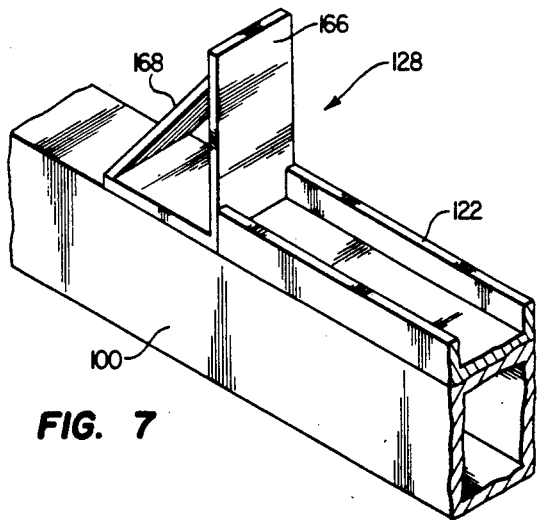
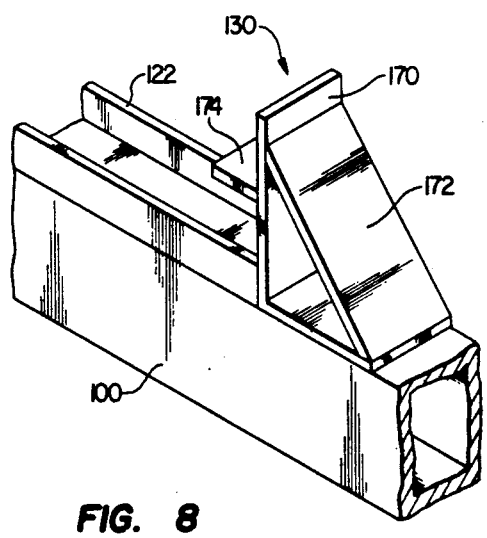
FIG. 7  FIG. 8

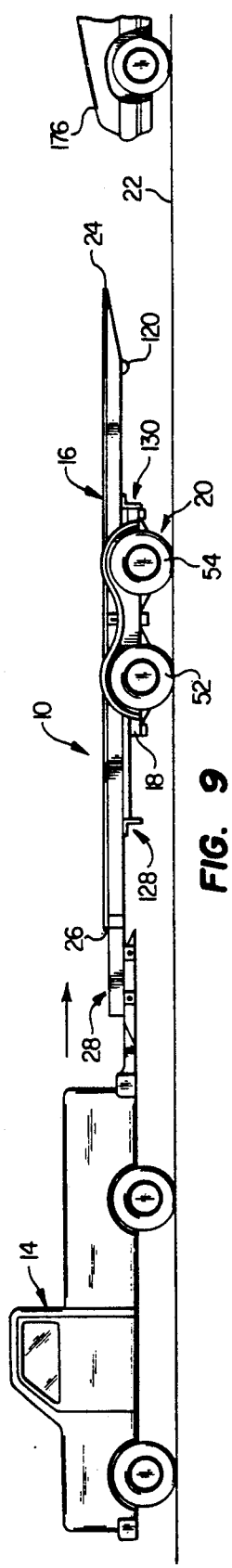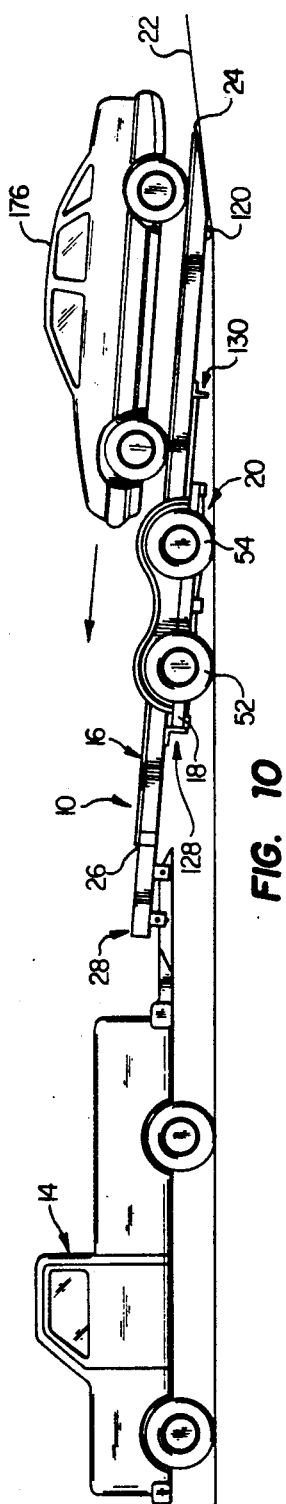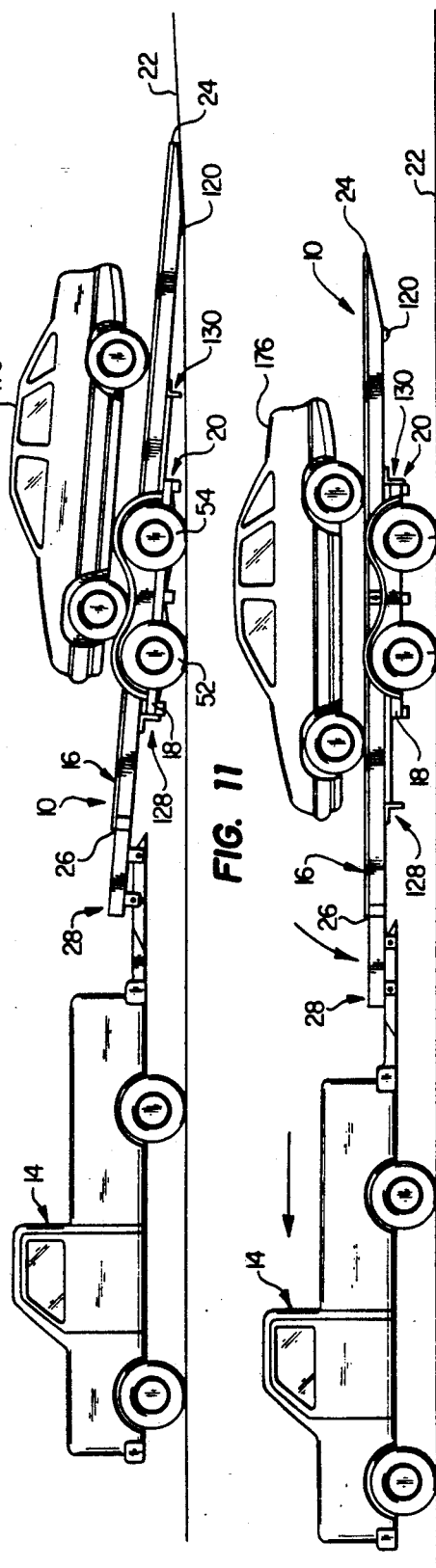

TRANSLATABLE TILT-BED TRAILER APPARATUS

BACKGROUND OF THE INVENTION

1. Field of the Invention

The present invention pertains to sliding bed trailers and, more particularly, to a sliding bed trailer having a pivotal trailer hitch for the sliding angulation thereof.

2. History of the Prior Art

The prior art is replete with trailer designs adapted for affording users maximum benefit of the trailer. Such designs have included mechanisms for addressing various trailer features, and the aspect of a movable trailer bed has found widespread attention. A movable trailer bed affords the user of the trailer the opportunity to move the bed and the load carried thereon to a particular position for facilitating both loading and unloading.

Examples of prior art trailer designs incorporating movable trailer beds include the following: U.S. Pat. No. 4,806,061 issued to Fenton teaches a sliding bed trailer having the distinct advantage of permitting the towing vehicle to move both the sliding bed and the load carried thereon relative to the trailer wheel base, which may be fixedly secured. With the trailer wheel base secured, the towing vehicle may move rearwardly toward said wheel base while maintaining its direct engagement with the trailer sliding bed frame. As shown in the Fenton patent, the longitudinal slant of the frame permits the rear end thereof to engage the underlying ground following the rearward movement to facilitate the loading and unloading of cargo thereon. In this configuration the direct engagement between the towing vehicle and the trailer and the sliding trailer bed frame is maintained and comprises the point of securement and control during both loading and towing of the trailer.

U.S. Pat. No. 2,859,889 issued to Love teaches the principle of a sliding trailer frame for smaller towing vehicles such as automobiles and the like. In this particular prior art reference, the trailer frame is moved relative to the trailer wheel base which is temporarily secured by brake locking means and then disengaged at the point when the trailer bed engages the atop portion of the tires of the trailer wheel base. At this point the brakes are released and the tires become the rolling surface upon which the trailer bed is permitted to move. As in the Fenton patent, this permits the trailer bed to be positioned relative to the trailer wheel base and positioned in an angulated orientation that facilitates loading and unloading cargo thereon and therefrom.

Another example of a towing trailer in which the support bed portion is translatable and tiltable relative to the wheeled undercarriage portion of the trailer may be found in U.S. Pat. No. 3,472,406 to Slipp which illustrates and describes a tilt-bed trailer utilized to tow a boat.

A current trailer design by individuals other than applicant includes a trailer bed slidable relative to the trailer wheel base which sliding bed may be secured to a smaller towing vehicle and which bed slides up on the rollers secured to the wheel base. In this particular design, the direct engagement between the trailer bed and the towing vehicle through the trailer hitch inhibits the angulation of the trailer bed relative to the trailer wheel base during the rearwardly disposed operation.

These and other conventional translatable tilt-bed trailer devices have associated therewith a variety of well-known problems, limitations and disadvantages. For example, to cause the necessary translation and downward tilting of the trailer bed relative to its wheeled undercarriage, it is necessary to temporarily lock the wheels of the undercarriage. This is typically effected using electric trailer coaster brakes operable from within the towing vehicle. However, this type of braking system is not designed to positively look the trailer brakes, and thus does not always provide entirely satisfactory results during loading and unloading of the trailer.

Additionally, conventional translatable tilt-bed trailers of the general type described above are not easily operable by one man-a helper is typically required. For example, it is often necessary for one man to remain in the towing vehicle and operate the trailer's electric brakes while a helper attends to the loading and unloading of cargo onto and off of the trailer. Moreover, a helper is typically necessary during rearward tilting of the trailer bed to signal the towing vehicle when the rear end of the downwardly tilting trailer bed reaches the ground since if the bed continues to be driven rearwardly after this point it can dig into the ground and jackknife. Additionally, the assistance of a helper is often required to relatch the trailer bed to its undercarriage, and re-lock the tiltable towing frame in its over-the-road orientation if the frame is provided with this feature.

From the foregoing it can be seen that it would be desirable to provide a translatable tilt-bed trailer in which the above-mentioned problems, limitations and disadvantages are eliminated or at least substantially reduced. It is accordingly an object of the present invention to provide such a trailer.

SUMMARY OF THE INVENTION

In carrying out principles of the present invention, in accordance with a preferred embodiment thereof, an improved translatable tilt-bed trailer is provided which is easily operable by one man without the assistance of a helper. The trailer comprises an elongated bed structure rollingly supported atop the elevated frame of a wheeled undercarriage for movement relative thereto between forward and rear limit positions. A releasably lockable jointed tongue structure at the front end of the bed structure is connectable to the hitch ball on a towing vehicle and, when unlocked, permits the weight of the bed to tilt it rearwardly and downwardly into rear end engagement with the ground when the bed is moved toward its rear limit position. With the jointed tongue structure looked, and the bed in its over-the-road, forward limit position relative to the wheeled undercarriage, latch means are operative to releasably look the bed to the undercarriage frame.

According to a feature of the present invention, the undercarriage wheel brakes may be firmly locked by a mechanical braking system having an actuator portion conveniently supported on the undercarriage.

According to another feature of the invention, the aforementioned latch means are automatically operative to releasably lock the bed to the undercarriage frame by forming two longitudinally spaced apart mechanical interlocks therebetween in response to the bed structure forwardly reaching its forward limit position. In a preferred embodiment thereof, the latching means include pin means for interconnecting a longitudinally intermediate portion of the undercarriage frame to a frame portion of the bed, and means associated with rear stop means on the bed structure frame for creating a telescoping interlock between the bed structure frame and a rear end portion of the undercarriage frame.

According to yet another feature of the present invention, front stop means are provided on the bed structure and are operative to engage a front end portion of the undercarriage frame and prevent further rearward movement of the bed relative to the undercarriage when the bed reaches its rear limit position. Importantly, these front stop means are longitudinally positioned on the bed structure in a manner such that they are brought into abutment with the undercarriage frame just as a rear end portion of the bed touches or is brought into close adjacency with the ground, thereby preventing the rear bed end portion from digging onto the ground and causing trailer jackknifing.

In combination, these features permit the translatable tilt-bed trailer of the present invention to be easily operated by one man without the previous necessity of a helper. To load the trailer, for example, the towing vehicle driver simply backs the trailer to adjacent the cargo to be loaded, sets the towing vehicle brakes, walks back to the undercarriage, sets the mechanical undercarriage brakes, and unlocks the jointed tongue structure and the bed-locking pin means.

The driver then re-enters the towing vehicle and backs it toward the now stationary undercarriage until the abutment of the front stop means with the undercarriage frame signals the driver that the rear end of the bed structure has been tilted downwardly into engagement with or into close adjacency with the ground. The cargo is then moved upwardly and forwardly along the now ramped bed structure and is suitably secured thereto.

Next, the driver re-enters the towing vehicle and drives it forwardly until the rear bed structure stop means are brought into abutment with the undercarriage frame, thereby tilting the bed structure back to its original horizontal orientation and causing the aforementioned latch means to automatically re-lock the bed structure to the undercarriage at two longitudinally spaced locations along the undercarriage frame.

Finally, the driver exits the towing vehicle, unlocks the mechanical undercarriage brakes, re-locks the jointed tongue structure re-enters the towing vehicle, and drives the loaded cargo away.

BRIEF DESCRIPTION OF THE DRAWINGS

For a more complete understanding of the present invention, and for further objects and advantages thereof, reference may now be had to the following description taken in conjunction with the accompanying drawings in which:

FIG. 3 is an enlarged scale bottom side perspective view of an elongated, movable support bed portion of the trailer;

FIG. 4 is a top side perspective view of a front end portion of the support bed, with a top deck portion thereof being removed for illustrative purposes;

FIG. 5 is an enlarged scale side elevational view of a pivotal hitch tongue portion of the support bed;

FIGS. 6A and 6B are enlargements of the dashed circle area 6 in FIG. 2 and illustrate the structure and operation of a support bed locking pin assembly portion of the trailer;

FIG. 7 is an enlargement of the dashed circle area 7 in FIG. 3 and illustrates, in an upside down orientation for descriptive purposes, a front stop member depending from the underside of the support bed;

FIG. 8 is an enlargement of the dashed circle area 8 in FIG. 3 and illustrates, in an upside down orientation for descriptive purposes, a rear stop member depending from the underside of the support bed; and FIGS. 9–12 are simplified schematic side elevational views of the trailer and towing vehicle and sequentially depict the operation thereof in loading a vehicle onto the trailer support bed.

DETAILED DESCRIPTION

Figure 1:
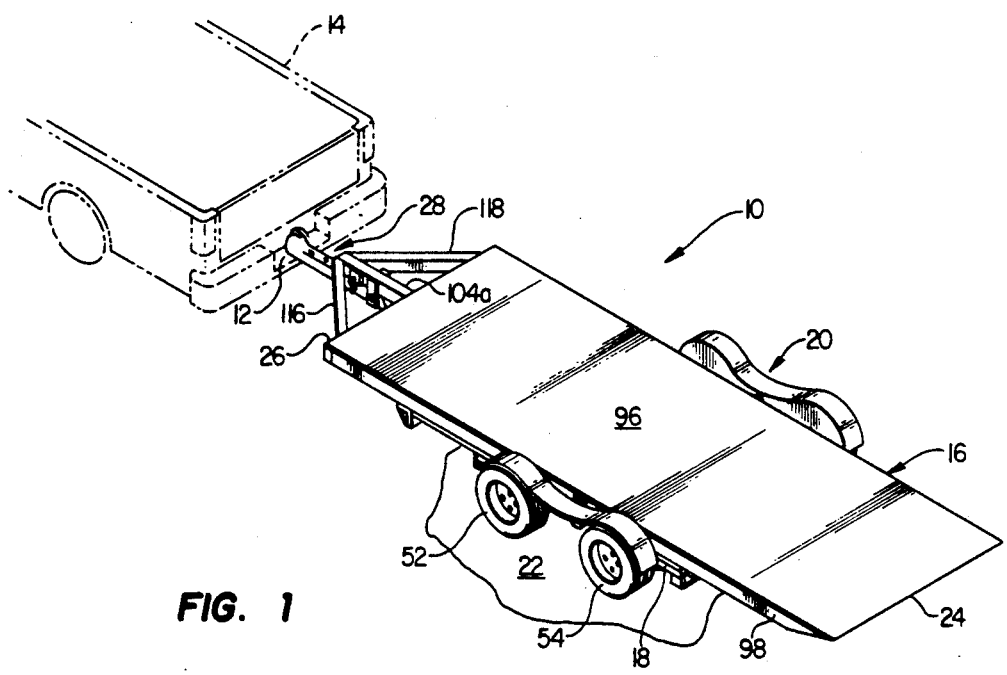
FIG. 1 is a perspective view of an improved translatable tilt-bed trailer embodying principles of the present invention and operatively connected to a suitable towing vehicle shown in phantom.

Perspectively illustrated in FIG. 1 is an improved translatable tilt-bed trailer 10 which embodies principles of the present invention and is releasably connectable to a hitch ball 12 operatively secured to the rear end of a suitable towing vehicle 14, a portion of which is illustrated in phantom in FIG. 1. The trailer 10 basically comprises an elongated rectangular support bed structure 16 which is movably supported atop the elevated frame portion 18 of a dual axle, wheeled undercarriage 20. With the trailer 10 in its illustrated over-the-road orientation, the support bed 16 is generally parallel to the ground 22, with the rear end 24 of the bed disposed rearwardly of the undercarriage frame 18, and the front end 26 of the bed being disposed forwardly of the undercarriage frame. The front end 26 of the support bed 16 is secured to the hitch ball 12 by a jointed tongue assembly 28 subsequently described herein.

Figure 2:
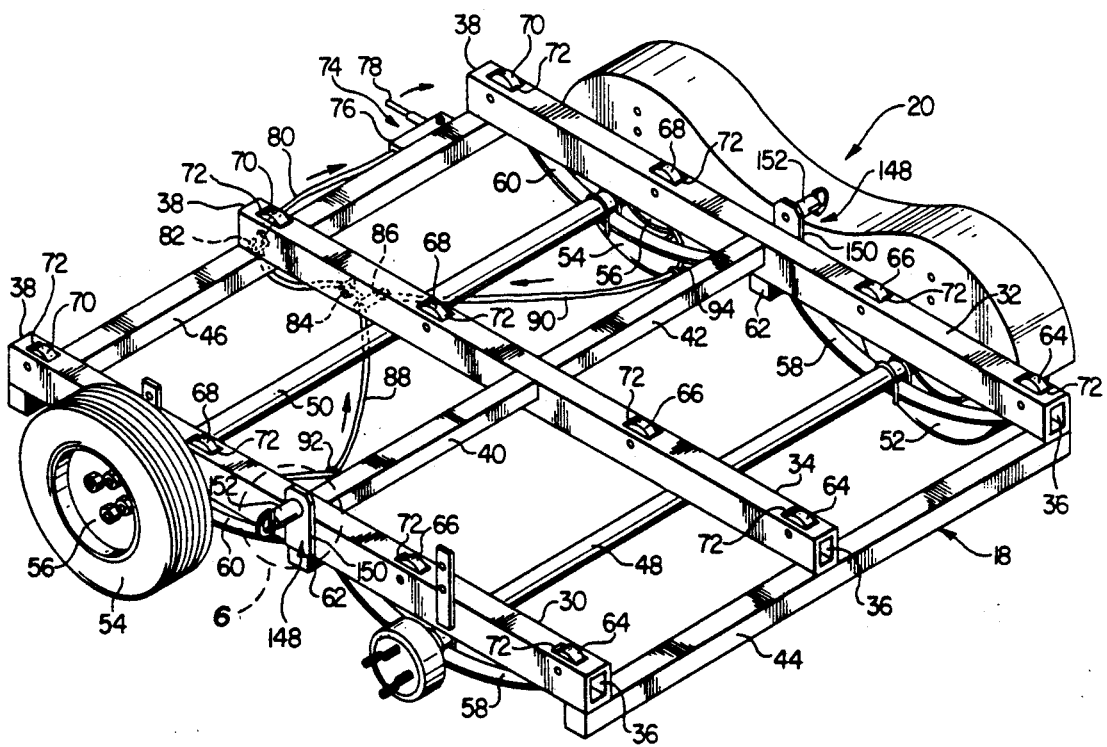
FIG. 2 is an enlarged scale front end perspective view of a wheeled undercarriage portion of the trailer with a fender and one wheel being removed for illustrative purposes.

Referring now to FIG. 2, the elevated frame 18 of the wheeled undercarriage 20 includes two elongated outer side members 30 and 32 which are parallel to one another and longitudinally extend in front-to-rear directions, and an elongated central member 34 which is disposed between and parallel to the members 30 and 32. As illustrated, the three frame members 30, 32 and 34 are of a square tube construction and have open front ends 36, and open rear ends 38. Longitudinally central portions of the frame members 30, 32 and 34 are interconnected by transverse bracing members 40 and 42. Additionally, the front and rear ends 38, 36 of the frame members 30, 32 and 34 are respectively interconnected by front and rear transverse cross bars 44 and 46 secured to the undersides of the frame members 30, 32 and 34.

The undercarriage frame 18 is positioned above a parallel, spaced apart pair of front and rear axles 48 and 50 which extend transversely to the frame members 30, 32 and 34 and are rotatably secured at their outer ends to a pair of front wheels 52 (one of which has been removed for illustrative purposes) and a pair of rear wheels 54. For purposes later described, each of the rear wheels 54 is provided with mechanically operable brakes 56. As is customary, the undercarriage wheels may also be provided with electric "coaster" brakes which, in a conventional manner, may be selectively operated by control means (not shown) disposed within the cab of the towing vehicle.

At the opposite sides of the undercarriage frame 18, the outer ends of the axles 48,50 are resiliently connected to the undersides of the outer frame members 30 and 32 by a pair of front and rear leaf spring structures 58 and 60, with each spring pair 58,60 being operatively interconnected by a schematically depicted spring equalizing structure 62. In a conventional manner, the spring equalizing structures 62 permit a substantial degree of front and rear tilting of the frame 18 without appreciably lifting any of the undercarriage wheels off the ground.

To rollingly support the bed structure 16 (FIG. 1) atop the undercarriage frame 18 in a manner subsequently described, each of the undercarriage frame members 30, 32 and 34 is provided with a longitudinally spaced series of four support wheels or rollers 64, 66, 68 and 70. Each of these support wheels is journaled within its associated frame member for rotation about an axis parallel to the axles 48 and 50, and projects upwardly beyond the top side surface of the frame member through a suitable slot 72 formed therein.

In addition to the conventional, electrically operable coaster brakes which may be incorporated in the undercarriage 20, according to an important aspect of the present invention a manually operable mechanical braking system 74 is also incorporated therein. As shown in FIG. 2, the braking system 74 includes a small housing structure 76 secured to the rear crossbar 46 inwardly adjacent the rear end 38 of the frame member 32. A hand lever 78 is pivotally secured to the housing 76 and is operatively connected to a main cable 80 which is extended through eye members 82 and 84 respectively secured to a longitudinally central portion of the crossbar 44 and the underside of the frame member 34. The outer end of the cable 80 is secured to a coupling member 86 which, in turn, is anchored to the inner ends of a pair of branch cables 88 and 90. From their connections to the coupling member 86, the branch cables 88,90 pass through eye members 92 and 94, and have their outer ends operatively connected to the previously mentioned mechanically operable wheel brakes 56.

By manually pivoting the lever 78, the cables 80, 88 and 90 are tensioned, as indicated by their associated arrows, to positively lock the wheel brakes 56, thereby preventing rolling movement of the undercarriage 20 along the ground. When desired, the brakes 56 may be unlocked simply by pivoting the lever 78 in an opposite direction to slacken the cables 80, 88 and 90.

The mechanical braking system 74 incorporated in the undercarriage 20 is particularly advantageous in the overall operation of the trailer 10, as subsequently discussed herein, in that it is operable to positively lock the brakes 56. Additionally, the system 74 is conveniently operable from a position immediately adjacent the undercarriage 20 and does not have to be operated (as in the case of electric coaster brakes) from within the towing vehicle.

Turning now to FIG. 3, the support bed structure 16 includes an elongated rectangular deck plate 96 suitably secured to and extending along the top side of an elongated frame structure 98. Frame structure 98 includes a laterally spaced apart, parallel pair of elongated outer side members 100, 102 and an elongated intermediate member 104 centrally disposed therebetween and having a front end portion 104$_a$ which projects forwardly beyond the front ends of the members 100,102. The longitudinally extending frame members 100, 102 and 104 are interconnected by front cross members 106 and 108, and by a longitudinally spaced series of additional cross members 110 and 112. Diagonal front cross members 114 and 116 are utilized to respectively interconnect the outer end of the front frame member portion 104$_a$ to the transverse front cross members 106 and 108. Underlying a rear end portion of the frame 98 is a downwardly and rearwardly sloping bottom panel 118 which is positioned rearwardly adjacent a pair of rear end rollers 120 which are secured to the top deck plate 96 and projecting downwardly beyond the front side edge of the bottom end panel 118.

Respectively secured to and longitudinally extending along the bottom sides of the frame members 100, 102 and 104 are elongated, downwardly opening track channel structures 122, 124 and 126. For purposes later described, a pair of front stop structures 128 depend from the frame members 100 and 102 adjacent the front ends of the track structures 122 and 124, and a pair of rear stop structures 130 depend from the frame members 100,102 adjacent the rear ends of the track structures 122 and 124. Additionally, a pair of longitudinally aligned looking pin holes 132 are extended through the frame members 100 and 102 in directions parallel to the cross members 110 As illustrated in FIGS. 6A and 6B, these looking pin holes have vertically elongated rectangular configurations.

With reference now to FIGS. 4 and 5, the jointed tongue assembly 28 includes the front end portion 104$_a$ of the central frame member 104, and a relatively short draw bar structure 134 disposed beneath the front frame member portion 104$_a$. A front end portion of the draw bar structure 134 is defined by a conventional socket structure 136 configured to upwardly receive the hitch ball 12 (FIG. 1) and be releasably locked thereto by the usual pivotal latch member 138. A rear end portion of the draw bar structure 134 is pivotally connected to a longitudinally intermediate section of the frame member portion 104$_a$ by means of a pair of flanges 140 secured to opposite sides of the frame member portion 104$_a$, straddling a rear end portion of the draw bar 34, and pivotally connected thereto by a suitable retaining pin 142.

The front end of the frame member portion 104$_a$ may be releasably secured to he draw bar 134 by means of a pair of flanges 144 which are secured to and project downwardly beyond opposite sides of the frame portion 104$_a$. When the frame portion 104$_a$ is parallel to the draw bar 134, the tongue assembly elements 104$_a$ and 134 are releasably locked to one another by means of a looking pin 146 (FIG. 4) which is inserted through aligned holes 147, 149 (FIG. 5) respectively formed through the flanges 144 and the draw bar 134. Removal of the pin 146 permits the front frame member end portion 104$_a$, and thus the entire bed structure frame 98, to rearwardly and downwardly pivot relative to the draw bar 134.

Returning now to FIGS. 2 and 3, with the bed structure 16 operatively placed atop the undercarriage frame structure 18, the three longitudinally extending rows of support wheels 68 (FIG. 2) are upwardly received in the three track structures 122, 124 and 126 on the underside of the support bed frame structure 16, the lengths of these track structures being considerably longer than the lengths of the three support wheel rows. As will be subsequently described, this permits the support bed structure 16 to be forwardly rolled along the top of the undercarriage frame structure 18 to a forward limit position (FIGS. 1 and 9) in which the bed structure 16 is generally parallel to the ground 22 and the rear stop structures 130 (FIG. 3) engage the rear end of the undercarriage frame 18 in a manner also subsequently described. Specially designed bed locking structures 148 (FIG. 2) are secured to the undercarriage frame members 30 and 32 and are operable as later described to lock the support bed structure 16 in the aforementioned forward limit position thereof.

The support bed structure 16 is also rearwardly movable relative to the undercarriage frame 18 to a rear limit position (FIG. 10) in which the bed 16 is rearwardly and downwardly tilted, with a rear end portion thereof (namely, the rear end wheels 120) touching the ground 22, and the front stop structures 128 (FIG. 3) engaging the front end of the undercarriage frame 18 as later described.

Referring now to FIGS. 2, 6A and 6B, each of the bed locking structures 148 includes an upstanding tab member 150 secured to the outer side of one of the undercarriage frame members 30 and 32, and having an outwardly projecting hollow cylindrical housing 152 with diametrically opposite outer end notches 154 formed therein. Coaxially disposed within the housing 152 is a circularly cross-sectioned locking pin 156 having a semicircular pull ring 158 anchored to its outer end. Within the housing 152, the pin 156 extends through a washer 160 anchored within the housing, and a washer 162 which is coaxially anchored to a longitudinally intermediate portion of the pin 156 and is axially slidable within the housing 152. A cylindrical coil spring member 164 circumscribes the pin 156 within the housing 152, the spring 164 bearing at its opposite ends against the washers 160 and 162, thereby urging the illustrated pin 156 to the right as viewed in FIGS. 6A and 6B.

The pin 156 may be moved to a latching position, in which the pin 156 enters the vertically elongated rectangular hole 132 in the bed structure frame member 122 when the hole 132 is aligned with the pin, by rotating the ring 158 and permitting it to enter the housing slots 154 as shown in FIG. 6A. Alternatively, as illustrated in FIG. 6B, the pin 156 may be releasably retained in an unlatching position, in which the pin 156 is withdrawn from the frame member hole 132, simply by outwardly pulling the ring 158 and rotating it out of alignment with the housing slots 154 and then releasing the pull ring so that it is spring-driven into engagement with the outer end of the housing 152.

Referring now to FIGS. 3 and 7, each of the front stop structures 128 depending from the underside of the bed structure frame 98 includes a depending stop plate member 166 positioned at the front end of one of the track channels such as the track 122 depicted in FIG. 7. The stop plate member 166 is braced by a sloping brace member 168 positioned forwardly of the plate member 166.

As best shown in FIG. 8, each of the rear stop structures 130 includes a depending stop plate member 170 positioned at the rear end of one of the outer track channels such as the track 122 shown in FIG. 8. The plate member 170 is braced by a sloping brace member 172 positioned rearwardly of the plate member 170. For a purpose subsequently described herein, each of the stop plate members 170 has a forwardly projecting tab 174 secured thereto and positioned downwardly of the rear end of the adjacent track channel.

The enhanced operational capabilities of the improved tilt-bed trailer 10, arising from several unique structural features of the trailer discussed above, will now be described in conjunction with FIGS. 9-12. For purposes of illustration, it will be assumed that a vehicle, such as the car 176, is to be loaded onto the bed structure 16. However, it will readily be appreciated that the trailer 10 may also be advantageously utilized in conjunction with many other types of cargo.

Referring first to FIG. 9, the elongated trailer bed structure 16 is schematically illustrated in its over-the-road forward limit position in which the bed 16 is generally parallel to the ground 22. The jointed tongue assembly 28 (FIGS. 4 and 5) is operatively secured to the towing vehicle hitch ball 12 and the tongue assembly 28 is in its releasably locked position, thereby restraining bed structure 16 against rearward and downward tilting. The bed structure 16 is locked to the undercarriage frame 18 by the locking pins 156 (FIGS. 6A and 6B) which are received in the aligned holes 132 in the bed structure frame outer side members 100 and 102.

With the trailer 10 in this over-the-road orientation, the towing vehicle 14 is simply backed toward the car 176 until the rear end 24 of the bed structure 16 is forwardly adjacent the car 176. The operator of the towing vehicle 14 then appropriately sets its brakes, exits the towing vehicle, and walks back to the rear end of the undercarriage 20. He then activates the mechanical braking system 74 (FIG. 2) to lock the undercarriage wheels 54, thereby preventing forward or rearward rolling movement of the undercarriage. The operator then unlocks the tongue assembly 28, by removing its locking pin 146 (FIG. 4), and also unlocks the bed structure 16 from the undercarriage frame 18 by moving the locking pins 156 to their unlatched positions (FIG. 6B).

Next, the operator re-enters the towing vehicle 14 and slowly backs it toward the car 176. This causes the trailer bed structure 16 to roll rearwardly along the undercarriage frame 17 until the weight of the bed structure 16 causes it to tip downwardly and rearwardly to bring a rear portion of the bed structure (namely, the rear support wheels 122 thereof) into contact with the ground 22 as schematically depicted in FIG. 10.

According to an important feature of the present invention, the front stop structures 128 are longitudinally positioned on the bed structure 16 in a manner such that when the rear support wheels 122 initially touch the ground 22 (or at least come into close adjacency therewith), the front stop structures 128 are brought into abutment with the front end of the rearwardly and downwardly tilted undercarriage frame 18. More specifically, the depending stop plate members 166 of the front stop structures 128 (FIG. 7) are brought into abutment with the front ends of the undercarriage frame members 30 and 32 (FIG. 2).

This feature of the present invention provides two primary advantages over conventional towing trailers having tiltable bed structures movably supported on their undercarriage portions. First, as the operator is slowly backing the towing vehicle 14, the easily discernible "clunk" occurring when the front stop member plates 166 abut the front end of the undercarriage frame alerts the operator that the rear support wheels 122 have contacted or are at least very closely adjacent the ground 22. No assistant is necessary to alert the towing vehicle operator that this event has occurred and it is thus time to stop the rearward movement of the towing vehicle.

Additionally, and quite importantly, the abutment between the front stop plates 166 and the front end of the undercarriage frame serves to prevent further rearward movement of the bed structure 16 relative to the braked undercarriage 20. In turn, this essentially eliminates the possibility that the rear end of the downwardly tilted bed structure 16 will "dig in" to the ground 22 and upwardly pivot the bed structure 16 causing an undesirable jackknifing of the trailer 10.

When the bed structure 16 is moved in the foregoing manner to its rear limit position schematically depicted in FIG. 10, the operator simply resets the brakes on the towing vehicle, walks back to the oar 176 to be loaded, and drives the oar 176 upwardly along the now-ramped bed structure 16 as indicated by the arrow in FIG. 10. The operator continues to drive the car 176 forwardly along the bed structure 16 until, as schematically depicted in FIG. 11, the car reaches a desired location on the bed structure, which remains in its rearwardly and downwardly tilted orientation shown in FIG. 10. He then appropriately secures the car 176 to the bed structure 16, using chains, tie-down down straps or the like, and returns the bed-locking pins 156 (FIG. 6A) to their latching positions.

Next, as schematically depicted in FIG. 12, the operator re-enters the towing vehicle 14 and slowly drives it in a forward direction. Such forward movement of the towing vehicle relative to the undercarriage causes the bed structure to tilt forwardly and downwardly back to its original horizontal orientation and moves the bed structure back to its forward limit position originally shown in FIG. 9.

As the rear stop structures 130 are brought into abutment with the rear end of the undercarriage frame, two additional unique features of the present invention are simultaneously brought into play. First, the forwardly projecting tabs 174 on the rear stop structures 130 (FIG. 8) are caused to forwardly enter the open rear ends 38 of the undercarriage frame members 30 and 32 (FIG. 2) to thereby create a telescoping interconnection between the bed structure frame 98 and the undercarriage frame 18. Additionally, as the rear stop structure plates 170 (FIG. 8) are brought into abutment with the rear end of the undercarriage frame 18, the bed locking pins 156 (FIGS. 6A and 6B) are automatically forced into the aligned locking pin holes 132 in the bed structure frame members 100 and 102.

As will be recalled, prior to the forward movement of the bed structure 16 relative to the undercarriage frame 18 the operator returned the bed-locking pins 156 to their latching positions shown in FIG. 6A, thereby permitting the spring elements 164 to bias the pins 156 inwardly toward their latching positions. However, with the frame member holes 132 disposed rearwardly of the pins 156, the inner ends of the pins 156 slidingly engage the nonapertured outer side surfaces of the frame members 100 and 102.

Accordingly, when these members 100,102 are forwardly moved relative to the undercarriage frame 18, the inner ends of the pins 156 simply slide along the members 100,102 until the holes 132 are brought into alignment with the pins 156, at which time the pins are automatically spring-driven into the holes 132, thereby re-locking the bed structure 16 to the undercarriage 20 as depicted in FIG. 6A. This automatic re-locking of the bed structure to the undercarriage is, of course, significantly augmented by the previously described telescopic interconnection between the rear stop structure tabs 174 and the undercarriage frame members 100 and 102.

Finally, the operator simply exits the towing vehicle, walks back to the undercarriage 20, deactivates the mechanical undercarriage brake system 74 (FIG. 2), re-locks the jointed tongue structure 28, re-enters the towing vehicle 14, and drives the towing vehicle away with the car 176 operatively secured to the top side of the bed structure 16.

The various structural improvements incorporated in the translatable tilt-bed trailer 10 as described above provide a variety of significant advantages compared to translatable tilt-bed trailers of conventional construction. For example, it should be readily apparent from the foregoing that the loading onto the trailer of the car 176 may be readily carried out by one man without the assistance of a helper at any stage of the loading process. The unloading of the oar 176 may also easily be effected by one man, simply by generally reversing the loading steps described above.

Specifically, the uniquely positioned front stop structures 128 eliminate the need for a helper to signal the towing vehicle operator that the rear end of the bed structure 16 has reached or is very closely adjacent its ground-engaging loading position. Additionally, the simultaneous automatic latching action of the bed-locking structures 148 and the rear stop structures 130 does not require the assistance of a helper, and indeed occurs without assistance from the towing vehicle operator. This dual latching feature of the present invention is also seen to provide for increased safety in the trailer 10.

Compared to conventional translatable tilt-bed trailers, the overall operation of the trailer 10 is also significantly improved via its incorporation on the undercarriage 20 of the previously described mechanical braking system 74. Specifically, large capacity towing trailers are typically provided with electric "coaster" brakes which are operable from within the interior of the towing vehicle. It is these coaster brakes which are conventionally utilized to maintain the undercarriage in a stationary position on the ground while the bed structure is moved forwardly or rearwardly relative thereto. However, as is well known, electric coaster brakes of this type are primarily designed to provide the undercarriage wheels with a temporary, partial braking force which is typically applied when the towing vehicle is being braked with its own braking system. Simply stated, electric coaster brakes of this type are not designed to actually lock up the wheels of the undercarriage structure.

This characteristic of the electric coaster brakes renders them less than entirely suitable for use in the loading and unloading operations carried out in conjunction with tilt-bed trailers. Particularly when the undercarriage is disposed on a sloping ground area, it is quite easy for the electric brakes to permit some undesirable slippage, thereby permitting the undercarriage to roll along the ground.

In the present invention, however, the mechanical braking system 74 is directly operable to positively lock the undercarriage against a undesired rolling movement thereof along the ground. Additionally, the mechanical braking system 74 may be operated from adjacent the undercarriage. In contrast to the usual electric braking systems used in this trailer application, it does not have to be operated from within the towing vehicle. Accordingly, a helper is not needed to effect and monitor the necessary braking of the undercarriage wheels.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

We claim:

1. An improved translatable tilt-bed trailer connectable to a hitch portion of a towing vehicle, comprising:
   a wheeled undercarriage having an elevated frame with front and rear ends, and wheel brakes;
   brake locking means carried by said undercarriage and being manually operable from adjacent said undercarriage to mechanically and releasably lock said wheel brakes;
   an elongated bed structure having front and rear ends;
   support means for supporting said bed structure atop said undercarriage frame for longitudinal movement relative thereto forwardly to a first position in which said bed structure is generally horizontally disposed, and rearwardly to a second position in which said bed structure is downwardly and rearwardly tipped to an extent such that a rear end portion thereof is at least closely adjacent the ground, said support means including;
   longitudinally extending track means formed on an underside of said bed structure, and
   roller means carried by said undercarriage frame and operatively receivable in said track means;
   jointed tongue means, secured to said front bed structure end, for releasably connecting said bed structure to said towing vehicle hitch portion, said tongue means being lockable to hold said bed structure in a generally parallel relationship with the ground, and unlockable to permit rearward and downward tilting of said bed structure as it is rearwardly moved toward said second position thereof;
   bed locking means for releasably locking said bed structure, in said first position thereof, to said undercarriage, said bed locking means being automatically operable to releasably lock said bed structure to said undercarriage frame, at two longitudinally spaced apart locations thereon, in response to said bed structure forwardly reaching said first position thereof;
   cooperating first abutment means on said undercarriage frame and said bed structure for automatically preventing further rearward movement of said bed structure relative to said undercarriage when, in response to rearward movement of said bed structure to said second position thereof with said wheel brakes locked, a rear end portion of said bed structure is at least closely adjacent the ground, to thereby substantially inhibit subsequent upward pivoting of said bed structure about said rear end portion thereof; and
   cooperating second abutment means on said undercarriage frame and said bed structure for preventing forward movement of said bed structure relative to said undercarriage past said first position of said bed structure,
   said bed locking means including a longitudinally facing rear end opening formed in said undercarriage frame, and means associated with the bed structure portion of said cooperating second abutment means and operative to forwardly enter said rear end opening when said bed structure forwardly reaches said first position thereof.

2. The improved translatable tilt-bed trailer of claim 1 wherein said brake locking means include:
   a manually operable brake actuating member supported on said undercarriage, and
   cable means for operably interconnecting said brake actuating member to said wheel brakes.

* * * * *

UNITED STATES PATENT AND TRADEMARK OFFICE
CERTIFICATE OF CORRECTION

PATENT NO. : 5,137,414

DATED : August 11, 1992

INVENTOR(S) : Wesley S. Sloan and Marvin D. Sloan

It is certified that error appears in the above-identified patent and that said Letters Patent is hereby corrected as shown below:

| | |
|---|---|
| Column 2, line 8 | Delete "look" Insert --lock-- |
| Column 2, line 52 | Delete "looked" Insert --locked-- |
| Column 2, line 55 | Delete "look" Insert --lock-- |
| Column 6, line 23 | Delete "looking" Insert --locking-- |
| Column 6, line 38 | Delete "34" Insert --134-- |
| Column 6, line 42 | Delete "he" Insert --the-- |
| Column 6, line 48 | Delete "looking" Insert --locking-- |
| Column 7, line 16 | Delete "looking" Insert --locking-- |
| Column 8, line 12 | Delete "looked" Insert --locked-- |
| Column 8, line 29 | Delete "looking" Insert --locking-- |
| Column 8, line 31 | Delete "looking" Insert --locking-- |

UNITED STATES PATENT AND TRADEMARK OFFICE
CERTIFICATE OF CORRECTION

PATENT NO.   : 5,137,414

DATED        : August 11, 1992

INVENTOR(S)  : Wesley S. Sloan and Marvin D. Sloan

It is certified that error appears in the above-identified patent and that said Letters Patent is hereby corrected as shown below:

| | |
|---|---|
| Column 9, line 9 | Delete "oar" Insert --car-- |
| Column 9, line 10 | Delete "oar" Insert --car-- |
| Column 10, line 14 | Delete "oar" Insert --car-- |

Signed and Sealed this

Twenty-sixth Day of October, 1993

Attest:

*Attesting Officer*

BRUCE LEHMAN

*Commissioner of Patents and Trademarks*